May 27, 1924.
R. BOHM
1,495,878
FAN BELT AND PULLEY CONSTRUCTION
Filed Nov. 22, 1921
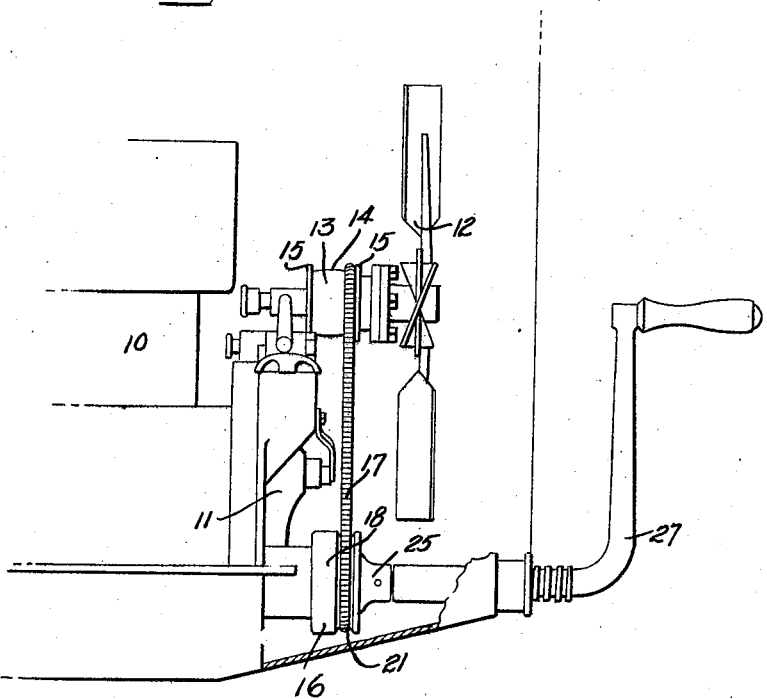
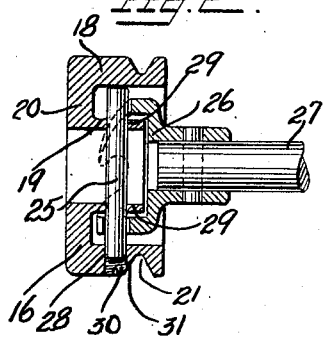
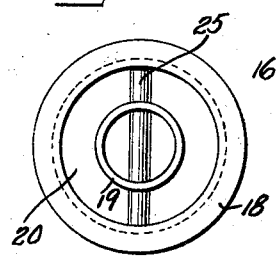
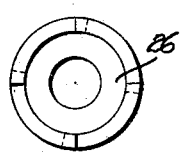
WITNESSES
H. T. Walker,
Hugh H. Cox
INVENTOR
RICHARD BOHM
BY
ATTORNEYS Patented May 27, 1924.

1,495,878

UNITED STATES PATENT OFFICE.

RICHARD BOHM, OF RICHMOND HILL, NEW YORK.

FAN BELT AND PULLEY CONSTRUCTION.

Application filed November 22, 1921. Serial No. 517,062.

*To all whom it may concern:*

Be it known that I, RICHARD BOHM, a citizen of the United States, and a resident of Richmond Hill, borough of Queens, in the county of Queens and State of New York, have invented a new and Improved Fan Belt and Pulley Construction, of which the following is a full, clear, and exact description.

This invention has relation to cooling devices for internal combustion motors and refers more particularly to an improved construction of crank shaft drive pulley and belt especially designed for use in connection with cooling fans for Ford motors.

Heretofore the crank shaft drive pulley for the fan belt has been constructed with an outer slightly transversely convexed peripheral surface over which a flat fan belt is trained and the arrangement of the drive and driven pulleys has been such as to dispose the belt in alignment with the timer or commutator, very often resulting, when the belt becomes loosened, in the contact of the same with parts of the timer and injury thereto.

The present invention aims to provide a pulley and belt construction which is associated and so arranged as to dispose the leads of the belt out of alignment with the timer, and to produce a stronger and better driving connection between the drive and driven pulleys without greatly increasing the cost of production or installation.

As a further object the invention contemplates an improved form of driving connection which affords the proper slippage between the connection and the driving and driven pulleys, and which provides means for tightening the connection when the same becomes loose due to wear.

With the above recited and other objects in view, the invention resides in the novel construction set forth in the following specification, particularly pointed out in the appended claim and illustrated in the accompanying drawings, it being understood that the right is reserved to embodiments other than those actually illustrated herein to the full extent indicated by the general meaning of the terms in which the claim is expressed.

In the drawings—

Figure 1 is a fragmentary side elevation of the front portion of the car unit of a Ford car illustrating the same equipped with the improved crank shaft drive pulley and belt.

Fig. 2 is an enlarged detail sectional view through the crank shaft drive pulley and cranking clutch.

Fig. 3 is a front elevation thereof.

Fig. 4 is a front elevation of the cranking clutch.

Fig. 5 is a fragmentary side elevation partly in section illustrating the method of connection between the extremities of the driving belt.

Referring the drawings by characters of reference, 10 designates a Ford motor, 11 the timer or commutator, 12 the motor cooling fan which is bolted to the usual form of driven pulley 13. The driven pulley 13 is provided with a transversely convexed periphery 14 having flanges or beads 15 at its opposite sides.

In lieu of the usual form of crank shaft drive pulley and belt, the improved crank shaft drive pulley 16 and driving connection or belt 17 is employed. The improved crank shaft drive pulley 16 consists of an outer annular rim 18 and an inner annular sleeve 19 connected at their rear ends by a web 20. The outer annular rim 18 is provided adjacent its forward extremity with an annular V-shaped groove 21 which groove is disposed substantially in alignment with the entrant angle defined at the juncture of the transverse convexed periphery 14 and forward flange or bead 15 of the driven pulley 13. The improved form of driving connection or belt employed in connection with the pulley 16 is constructed from a single length of wire 22 constructed in the form of a coiled expansion spring, the convolutions of which are normally in close contact. At one extremity the convolutions are reduced in diameter as at 23 whereby the same may be received in the form of a thread within the convolutions of the other extremity to establish a connection therebetween. To effect the connection between the opposite extremities of the belt 17, the belt ends are preferably rotated in opposite directions to the pitch of the convolutions and upon insertion of the reduced convolutions of one extremity within the opposite extremity, the untwisting action thereof will tend to thread the reduced convolutions within the convolutions at the opposite extremity to form a positive connection. When the ends of the belt are so connected it produces an endless driving belt which acts to resiliently embrace the side walls of the V-shaped groove 21 in the drive pulley 16 and the periphery of the driven pulley 13. The engagement of the belt in the groove maintains the same in the entrant angle of the driven pulley whereby the leads of the belt are disposed in advance and out of alignment with the timer 11. This positively prevents the belt from contacting with the exposed parts of the timer should it become loose.

The key pin 25 for securing the drive pulley 16 to the crank shaft and which also affords means with which the clutch 26 coacts to couple the crank 27 with the crank shaft is inserted through a single aperture 28 in the outer rim and through aligned apertures 29 in the inner sleeve 19. The inner extremity of the pin is designed to abut against the inner periphery of the outer rim and is retained in place by a retaining screw 30, the same being engaged in the outer threaded portion 31 of the opening 28.

I claim:

The combination with a motor cooling fan and a driven pulley secured thereto having a transversely convexed periphery and front and rear flanges, of a driving pulley having an annular groove in the periphery thereof adjacent the forward end of the same, said groove adapted to receive and maintain a driving belt trained about said pulleys in the entrant angle formed at the juncture of the front flange with the periphery of the driving pulley, as and for the purpose specified.

RICHARD BOHM.